(12) United States Patent
Noguchi et al.

(10) Patent No.: US 10,556,833 B2
(45) Date of Patent: Feb. 11, 2020

(54) CERAMIC HONEYCOMB FILTER AND ITS PRODUCTION METHOD

(71) Applicant: HITACHI METALS, LTD., Tokyo (JP)

(72) Inventors: Atsuhiro Noguchi, Miyako-gun (JP); Wataru Soga, Miyako-gun (JP)

(73) Assignee: HITACHI METALS, LTD., Tokyo (JP)

( * ) Notice: Subject to any disclaimer, the term of this patent is extended or adjusted under 35 U.S.C. 154(b) by 105 days.

(21) Appl. No.: 15/867,991

(22) Filed: Jan. 11, 2018

(65) Prior Publication Data

US 2018/0134630 A1   May 17, 2018

Related U.S. Application Data

(62) Division of application No. 15/513,693, filed as application No. PCT/JP2015/077882 on Sep. 30, 2015, now Pat. No. 9,981,881.

(30) Foreign Application Priority Data

Sep. 30, 2014 (JP) ................... 2014-201648

(51) Int. Cl.
    *C04B 38/00* (2006.01)
    *B01D 46/24* (2006.01)
    (Continued)

(52) U.S. Cl.
    CPC ........ *C04B 38/0012* (2013.01); *B01D 46/244* (2013.01); *B01D 46/2459* (2013.01); *C04B 35/195* (2013.01); *F01N 3/0222* (2013.01)

(58) Field of Classification Search
    CPC . C04B 38/0012; C04B 35/195; B01D 46/244; B01D 46/2429
    (Continued)

(56) References Cited

U.S. PATENT DOCUMENTS 4,568,402 A     2/1986  Ogawa et al.
10,301,220 B2 *  5/2019  Bubb ................. B01D 46/2459
(Continued)

FOREIGN PATENT DOCUMENTS

JP      63-28875 B2     6/1988
JP      2002-136817 A   5/2002
(Continued)

OTHER PUBLICATIONS

International Search Report of PCT/JP2015/077882 dated Dec. 28, 2015 [PCT/ISA/210].

*Primary Examiner* — Robert A Hopkins
(74) *Attorney, Agent, or Firm* — Sughrue Mion, PLLC (57) ABSTRACT

A ceramic honeycomb filter comprising a ceramic honeycomb structure having pluralities of flow paths partitioned by porous cordierite cell walls, and plugs formed in predetermined flow paths of the ceramic honeycomb structure; the plugs being formed by ceramic particles and an amorphous oxide matrix existing between the ceramic particles; in a cross section of the plugs, an area ratio A1 of the amorphous oxide matrix in a longitudinal range of ⅓×t from one end, and an area ratio A2 of the amorphous oxide matrix in a longitudinal range of ⅓×t from the other end meeting the relation of ½≤A1/A2≤2, wherein t represents the length of the plug in a direction perpendicular to the longitudinal direction of the plug.

8 Claims, 5 Drawing Sheets

(51) Int. Cl.
*F01N 3/022* (2006.01)
*C04B 35/195* (2006.01)

(58) Field of Classification Search
USPC .......................................... 55/523; 502/439
See application file for complete search history.

(56) References Cited

U.S. PATENT DOCUMENTS

| | | |
|---|---|---|
| 2006/0272306 A1 | 12/2006 | Kirk et al. |
| 2007/0039298 A1 | 2/2007 | Tokumaru |
| 2010/0080930 A1 | 4/2010 | Okazaki |
| 2013/0136893 A1 | 5/2013 | Bubb et al. |

FOREIGN PATENT DOCUMENTS

| | | |
|---|---|---|
| JP | 2005-125318 A | 5/2005 |
| JP | 2009-507745 A | 2/2009 |
| JP | 2009-196104 A | 9/2009 |
| JP | 2014-069158 A | 4/2014 |
| JP | 2015-505748 A | 2/2015 |
| WO | 2008/117611 A1 | 10/2008 |
| WO | 2008/117621 A1 | 10/2008 |

* cited by examiner

CERAMIC HONEYCOMB FILTER AND ITS PRODUCTION METHOD

CROSS REFERENCE TO RELATED APPLICATIONS

This application is a divisional of U.S. application Ser. No. 15/513,693, filed Mar. 23, 2017, which is the U.S. National Stage of International Application No. PCT/JP2015/077882, filed Sep. 30, 2015 (claiming priority based on Japanese Patent Application No. 2014-201648, filed Sep. 30, 2014), the contents of which are incorporated herein by reference in their entirety.

FIELD OF THE INVENTION

The present invention relates to a ceramic honeycomb filter for removing particulate matter from an exhaust gas discharged from diesel engines, and its production method.

BACKGROUND OF THE INVENTION

Figure 1A:
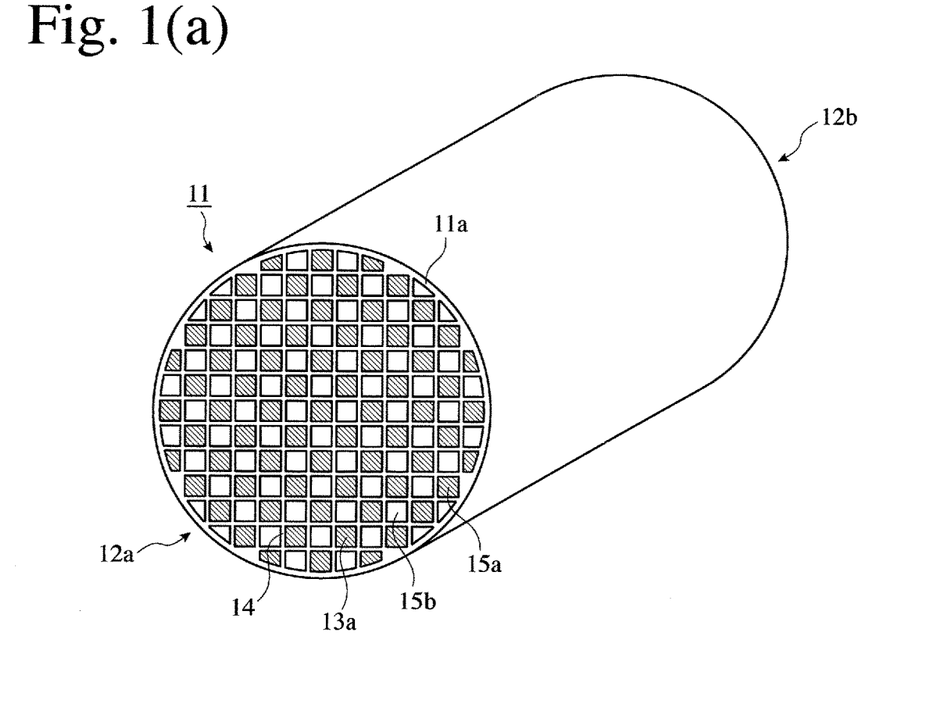
FIG. 1(a) is a perspective view schematically showing an example of the ceramic honeycomb filters of the present invention.
Figure 1B:
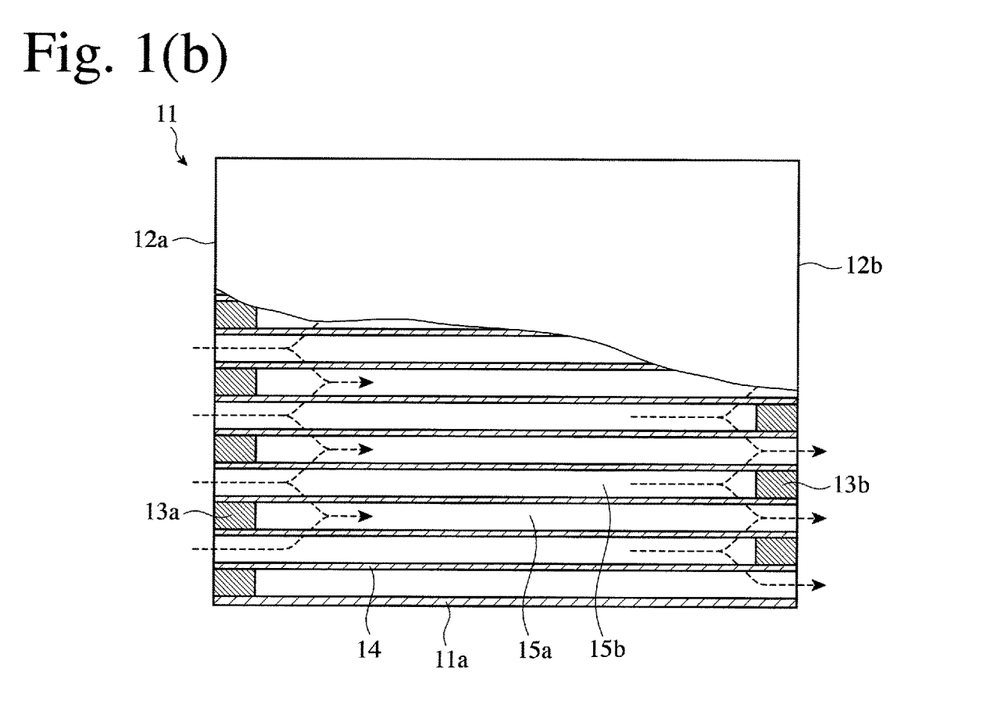
FIG. 1(b) is a view showing a longitudinal cross section of the ceramic honeycomb filter of the present invention shown in FIG. 1(a)

Investigation has been conducted to remove particulate matter discharged from diesel engines, by using particulate-matter-capturing ceramic honeycomb filters comprising ceramic honeycomb structures having porous cell walls, through which an exhaust gas containing particulate matter passes, namely diesel particulate filters (DPFs). As shown in FIG. 1, the ceramic honeycomb filter 11 comprises pluralities of flow paths 15a, 15b partitioned by porous cell walls 14, a peripheral wall 11a formed around the flow paths 15a, 15b, and plugs 13a, 13b alternately formed in end portions of the flow paths 15a, 15b. As shown in FIG. 1(b), an exhaust gas containing particulate matter flows into the flow paths 15b open on an exhaust gas inlet-side end surface 12a, passes through cell walls 14, and flows out of the flow paths 15a open on an exhaust gas outlet-side end surface 12b, during which particulate matter in the exhaust gas is captured by fine pores (not shown) in the cell walls 14.

When the captured particulate matter is excessively accumulated in a ceramic honeycomb filter, the pressure loss of the filter increases, likely resulting in power decrease of the engine. Accordingly, the captured particulate matter is periodically burned by an external ignition means such as an electric heater, a burner, etc., to regenerate the ceramic honeycomb filter. A set of two ceramic honeycomb filters are usually mounted for an alternate regeneration system, in which one is used while the other one is regenerated.

With respect to the characteristics of a honeycomb filter having the above structure, it is important to keep the pressure loss of a filter low to avoid decrease in engine performance. It is also required that the honeycomb filter has enough resistance to withstand heat shock due to rapid temperature change during regeneration, engine stop, etc. Thus, technologies for improving plugs of ceramic honeycomb filters have been disclosed so far, as described below.

As a technology of plugging end surfaces of a ceramic honeycomb structure at predetermined positions, JP 63-28875 B discloses a method for plugging open end surfaces of a ceramic honeycomb structure, comprising plugging ends of flow paths in a sintered honeycomb structure with a cordierite-forming material paste, and then sintering the cordierite-forming material to cordierite at a temperature of 1300° C. or higher. This method achieves complete plugging of flow paths of a ceramic honeycomb structure at open end surfaces, providing a highly reliable cordierite honeycomb filter having excellent heat shock resistance.

JP 2002-136817 A discloses a ceramic honeycomb filter obtained by plugging flow path ends of a sintered or unsintered ceramic honeycomb structure with a pulverized sintered or unsintered plugging material, which has the same composition as that of the ceramic honeycomb structure, and heating the plugging material at a high temperature of 1400° C. to form plugs at flow path ends of the ceramic honeycomb structure. It further describes that because plugs at flow path ends of this ceramic honeycomb filter are made of the same material as that of the ceramic honeycomb structure, the ceramic honeycomb structure and the plugs do not suffer cracking due to their thermal expansion difference and are free from troubles such as the peeling of plugs, when used under high-temperature conditions.

However, the ceramic honeycomb structure likely has a small thermal expansion coefficient because a cordierite-forming material is oriented by extrusion, while a cordierite-forming material is not substantially oriented in plugs. Accordingly, in the technologies described in JP 63-28875 B and JP 2002-136817 A, it is difficult to provide the ceramic honeycomb structure and the plugs with completely the same thermal expansion coefficient. Further, because the plugs are fused to the sintered ceramic honeycomb structure at high temperatures of 1300° C. or higher, large residual stress is generated after fusion. Thus, heat shock by an exhaust gas, and mechanical shock by engine vibration and road vibration, cracking occurs in plugs, their boundaries with the honeycomb structure, etc., likely resulting in the peeling of plugs while using the filter.

To solve such problems, JP 2005-125318 A discloses a ceramic honeycomb filter comprising porous cell walls defining flow paths for removing particulate matter from an exhaust gas, which is obtained by forming plugs in predetermined flow paths of a ceramic honeycomb structure made of a material comprising cordierite as a main crystal; at least part of the plugs being formed by at least ceramic particles and an amorphous oxide matrix of colloidal oxide. JP 2005-125318 A describes that this honeycomb filter is obtained by bonding the plugs to the ceramic honeycomb structure at 1000° C. or lower. According to this invention, there is little difference in a thermal expansion coefficient between the plugs comprising at least ceramic particles and the ceramic honeycomb structure, and a bonding temperature lowered by using an amorphous oxide matrix of colloidal oxide leaves less residual stress in the ceramic honeycomb structure, resulting in a ceramic honeycomb filter having excellent heat shock resistance. In addition, the low bonding temperature is effective to drastically reduce a production cost.

Though the ceramic honeycomb filter of JP 2005-125318 A used as a particulate-matter-capturing filter has excellent heat shock resistance, it has been found when it is used as a ceramic honeycomb filter carrying a catalyst such as an oxidation catalyst for accelerating the oxidation (combustion) of captured particulate matter, which may be called "catalyst-carrying filter" below), the temperature of a filter substrate is elevated by combustion, reducing the bonding strength of the plugs to cell walls, so that the plugs may be detached, resulting in low particulate-matter-capturing performance.

JP 2015-505748 A discloses a method for forming plugs hardenable at low temperatures without sintering by charging a aqueous composition comprising a refractory filler comprising coarse cordierite particles having a narrow particle size distribution with $d_{50}$ of 10-40 μm, an inorganic binder, and a binder, into a ceramic honeycomb body. It describes that the plugs are provided with less recesses when the aqueous composition charged into the ceramic honeycomb body is dried. JP 2015-505748 A describes that larger particle sizes in the filler reduce shrinkage and the overall movement of a composition in flow paths or fine pores, thereby reducing the number of recesses.

However, it has been found that the method described in JP 2015-505748 A does not provide sufficient bonding strength, when the aqueous composition charged into the ceramic honeycomb body is dried, for example, in a hot-air furnace.

Object of the Invention

Accordingly, an object of the present invention is to provide a ceramic honeycomb filter, in which plugs formed at 1000° C. or lower have good bonding strength to cell walls, and a method for producing such a ceramic honeycomb filter at a low plug-bonding temperature with drastically reduced production cost.

SUMMARY OF THE INVENTION

In view of the above object, the inventors have made intensive research on why plugs formed by at least ceramic particles and an amorphous oxide matrix of colloidal oxide have insufficient bonding strength to cell walls of a honeycomb filter, resulting in the detachment of plugs during use, finding that such problem is caused by the following phenomena when the plugs are bonded by heating and drying.

When a plugging material comprising ceramic particles and colloidal oxide is charged into flow path ends of a ceramic honeycomb structure, and dried by heating at a temperature of 1000° C. or lower, for example, in a hot-air furnace, water is evaporated from a flow path end surface side on which the plugging material is charged, because such side is exposed to hot air. With water evaporated from the flow path end surface side, water moves from the plugging material on the side opposite to the flow path end surface side (flow path inner side) to the flow path end surface, accompanied by the movement of colloidal oxide from the flow path inner side to the flow path end surface side. As a result, the concentration of colloidal oxide decreases on the flow path inner side, and increases on the flow path end surface side, resulting in large difference in the concentration of colloidal oxide between the flow path inner side and the flow path end surface side. Thus, the bonding of plugs on the flow path inner side is insufficient, so that the plugs have substantially shorter lengths, and thus insufficient bonding strength to cell walls.

As a result of further intensive research, the inventors have found that by drying the charged plugging material by microwave heating or high-frequency dielectric heating, the entire plugs are uniformly heated, resulting in substantially no difference in the concentration of colloidal oxide between the flow path end surface side and the opposite side. Because plugs and cell walls are uniformly bonded at any longitudinal position, a ceramic honeycomb filter having sufficient bonding strength between plugs and cell walls can be obtained. The present invention has been completed based on such findings.

Thus, the ceramic honeycomb filter of the present invention comprises a ceramic honeycomb structure having pluralities of flow paths partitioned by porous cell walls made of a material comprising cordierite as a main crystal, and plugs formed in predetermined flow paths of the ceramic honeycomb structure;

the plugs comprising ceramic particles and an amorphous oxide matrix existing between the ceramic particles;

the amorphous oxide matrix being 5-20 parts by mass per 100 parts by mass of the ceramic particles; and in a cross section of the plug including the center axis of the flow path, a ratio A1/A2 meeting the relation of $\frac{1}{2} \leq A1/A2 \leq 2$, wherein A1 represents an area ratio of the amorphous oxide matrix in a longitudinal range of $\frac{1}{3} \times t$ from one end, A2 represents an area ratio of the amorphous oxide matrix in a longitudinal range of $\frac{1}{3} \times t$ from the other end, and t represents the length of the plug in a direction perpendicular to the longitudinal direction of the plug.

The ratio A1/A2 of the area ratios A1 and A2 of the amorphous oxide matrix preferably meets the relation of $\frac{2}{3} \leq A1/A2 \leq 1.5$.

The amorphous oxide matrix is preferably silica.

The method of the present invention for producing a ceramic honeycomb filter comprising a ceramic honeycomb structure having pluralities of flow paths partitioned by porous cell walls made of a material comprising cordierite as a main crystal, and plugs formed in predetermined flow paths of the ceramic honeycomb structure; comprising charging a plugging material comprising at least 100 parts by mass of ceramic particles, 5-20 parts by mass on a solid basis of colloidal oxide and 1.5-4 parts by mass of a binder, into the predetermined flow paths of the ceramic honeycomb structure, and then drying the plugging material by microwave heating or high-frequency dielectric heating to form the plugs; and the ceramic particles having a particle size distribution having at least a first peak, and a second peak lower than the first peak, the first peak being in a particle size range of 100-200 μm, and the second peak being in a particle size range of 10-30 μm.

Before the plugging material charged into the predetermined flow paths of the ceramic honeycomb structure is subjected to microwave heating or high-frequency dielectric heating, an end surface of the ceramic honeycomb structure on the plugging-material-charged side is preferably brought into contact with a heat-conducting means for preheating at 30-80° C. for 1-10 minutes.

The ceramic particles are preferably obtained by mixing 20-50% by mass of first ceramic particles having an average particle size of 90-200 μm with 50-80% by mass of second ceramic particles having an average particle size of 5-30 μm.

The microwave heating is preferably conducted by irradiating the plugging material with microwave having power of 1-30 W/g per a unit mass of the plugging material for 1-20 minutes.

The high-frequency dielectric heating is preferably conducted by high-frequency electric power of 1-20 W/g per a unit mass of the plugging material for 1-5 minutes, with a distance of 1-15 mm between the end surface of the ceramic honeycomb structure and a high-frequency power electrode.

The colloidal oxide is preferably colloidal silica.

The ceramic particles are preferably cordierite powder.

Effects of the Invention

The ceramic honeycomb filter of the present invention has excellent bonding strength between plugs and cell walls, because there is no large difference in the concentration of colloidal oxide between the flow path end surface side and opposite side of the plugs. The method of the present invention can produce a ceramic honeycomb filter having high bonding strength between plugs and cell walls, even when the plugs are bonded at a low temperature. The lower bonding temperature of plugs provides drastic production cost reduction.

DESCRIPTION OF THE PREFERRED EMBODIMENTS

The embodiments of the present invention will be specifically explained below without intention of restricting the present invention thereto. It should be noted that proper modifications and improvements can be made based on the usual knowledge of those skilled in the art within the scope of the present invention.

[1] Ceramic Honeycomb Filter

The ceramic honeycomb filter of the present invention comprises a ceramic honeycomb structure having pluralities of flow paths partitioned by porous cell walls made of a material comprising cordierite as a main crystal, and plugs formed in predetermined flow paths of the ceramic honeycomb structure;

the plugs comprising ceramic particles and an amorphous oxide matrix existing between the ceramic particles;

the amorphous oxide matrix being 5-20 parts by mass per 100 parts by mass of the ceramic particles; and in a cross section of the plug including the center axis of the flow path, the plugs having a ratio of A1/A2 meeting the relation of $1/2 \leq A1/A2 \leq 2$, wherein A1 represents an area ratio of an amorphous oxide matrix in a longitudinal range of $1/3 \times t$ from one end, A2 represents an area ratio of the amorphous oxide matrix in a longitudinal range of $1/3 \times t$ from the other end, and t represents the length of the plug in a direction perpendicular to the longitudinal direction of the plug. In the case of a honeycomb having a square or hexagonal lattice shape, "t" corresponds to the distance between opposing cell walls. In the case of a honeycomb having a triangular lattice shape, "t" corresponds to the height of a triangle. "t" may be called the width of plug below.

When the plugs meet the above requirement, namely when there is small difference between the concentration of an amorphous oxide matrix in a range of $1/3 \times t$ from one end of the plug (for example, plug end on the flow path end surface side), and the concentration of an amorphous oxide matrix in a longitudinal range of $1/3 \times t$ from the other end of the plug (for example, on the flow path inner side), wherein t represents the length of the plug in a direction perpendicular to the longitudinal direction of the plug, the plugs have good bonding strength to cell walls in their entire length from one end to the other end, so that the plugs are not easily detached during use, resulting in high resistance to particulate-matter-capturing performance decrease. The ratio A1/A2 of the area ratios A1 and A2 of an amorphous oxide matrix meets the relation of preferably $2/3 \leq A1/A2 \leq 1.5$, more preferably $0.8 \leq A1/A2 \leq 1.3$.

Figure 3:
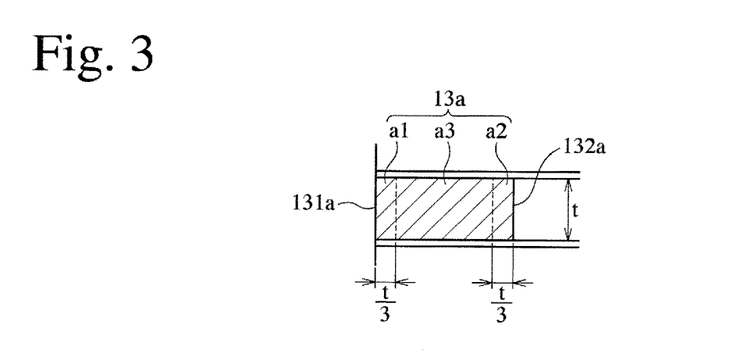
FIG. 3 is a schematic view showing the positions of measuring the area ratio of an amorphous oxide matrix in a plug in the ceramic honeycomb filter.
Figure 6:
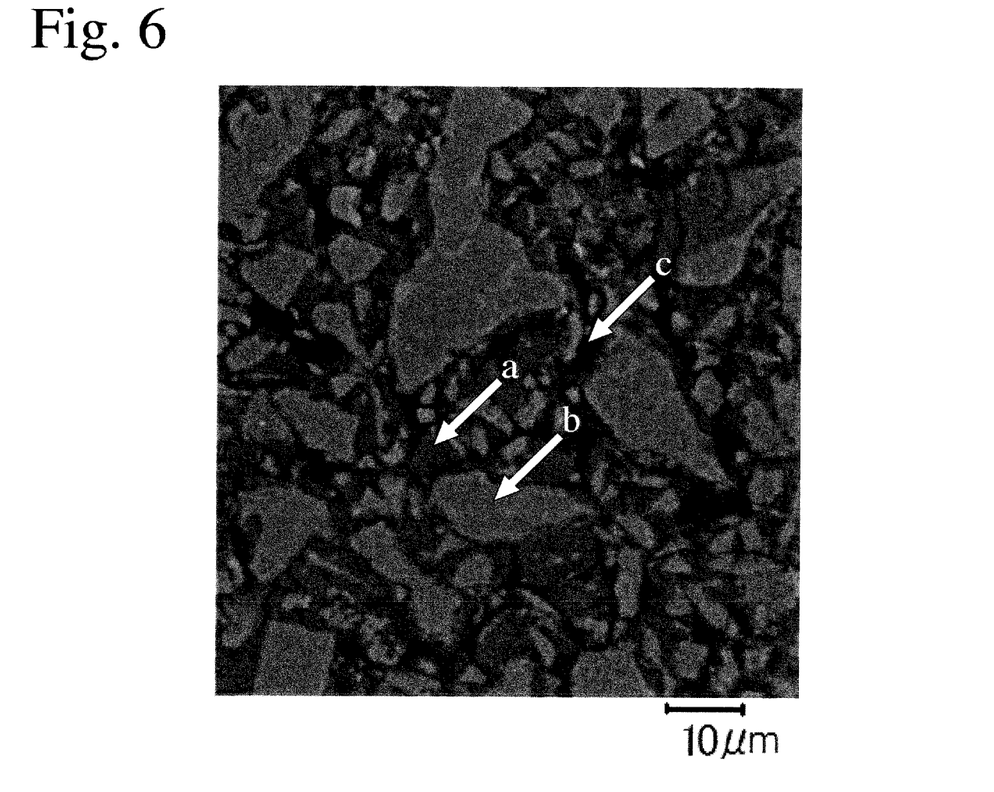
FIG. 6 is an electron photomicrograph showing a cross section of a plug in the ceramic honeycomb filter produced in Example 1 of the present invention.
Figure 7:
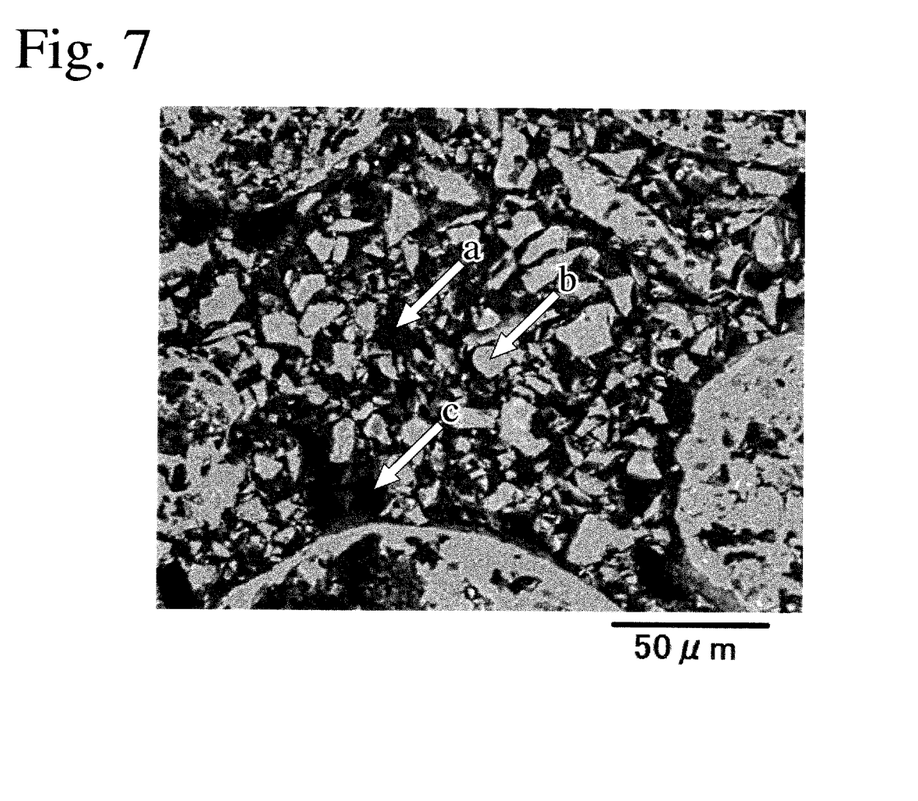
FIG. 7 is an electron photomicrograph showing a cross section of a plug in the ceramic honeycomb filter produced in Example 1 of the present invention.

The area ratios A1 and A2 of an amorphous oxide matrix in a flow-path-direction, center-axis-including cross section of a plug can be determined, for example, as follows. Namely, electron photomicrographs (FIGS. 6 and 7) taken on a flow-path-direction, center-axis-including cross section of a plug in the ceramic honeycomb filter are analyzed by an image analyzer (for example, Image-Pro Plus ver. 7.0 available from Media Cybernetics). In the electron photomicrographs of FIGS. 6 and 7 having black portions, high-concentration gray portions, and low-concentration gray portions, it is confirmed by EDX composition analysis that the high-concentration gray portions (shown by the arrow a) are an amorphous oxide matrix ($SiO_2$), the low-concentration gray portions (shown by the arrow b) are aggregate (cordierite $5SiO_2 \cdot 2Al_2O_3 \cdot 2MgO$), and the black portions (shown by the arrow c) are voids. The area of the amorphous oxide matrix (for example, portion shown by the arrow) is determined from the photograph, and divided by a field area to obtain the area ratio. As shown in FIG. 3, the area ratio A1 of an amorphous oxide matrix in a range a1 corresponding to $1/3$ of the width t of the plug 13a from one end 131a (an end of a plug on the flow path end surface side in the figure), and the area ratio A2 of an amorphous oxide matrix in a range a2 corresponding to $1/3$ of the width t of the plug 13a from the other end 132a (an end of a plug inside a flow path in the figure) are determined.

In the ceramic honeycomb filter of the present invention, the amorphous oxide matrix is preferably silica. When the amorphous oxide matrix is silica, the plugs have such high bonding strength to the cell walls that they are less detachable during use, avoiding decrease in particulate-matter-capturing performance. The amorphous oxide matrix is preferably made of colloidal oxide. The colloidal oxide is preferably colloidal silica.

[2] Production Method of Ceramic Honeycomb Filter

The production method of the ceramic honeycomb filter of the present invention will be explained below. The ceramic honeycomb filter for removing particulate matter from an exhaust gas is produced by forming plugs by charging a plugging material into predetermined flow paths of a ceramic honeycomb structure having pluralities of flow paths partitioned by porous cell walls made of a material comprising cordierite as a main crystal. The plugging material comprises at least 100 parts by mass of ceramic particles, 5-20 parts by mass on a solid basis of colloidal oxide, and 1.5-4 parts by mass of a binder. The ceramic particles have a particle size distribution having at least a first peak, and a second peak lower than the first peak, the first peak being in a particle size range of 100-200 μm, and the second peak being in a particle size range of 10-30 μm.

Figure 2A:
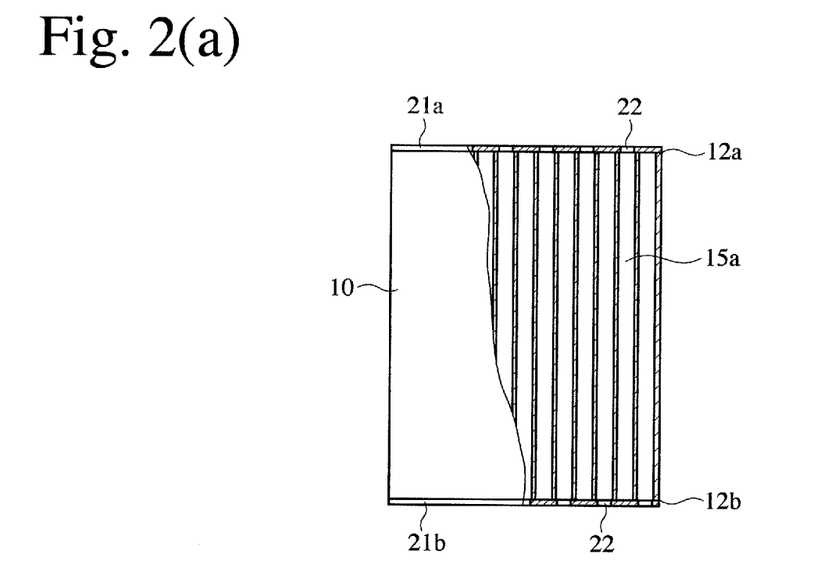
FIG. 2(a) is a schematic view showing a plugging step in the production method of a ceramic honeycomb filter.

A method of charging a plugging material into predetermined flow paths of a ceramic honeycomb structure will be explained referring to FIG. 2. Plugging films 21a, 21b are attached to end surfaces 12a, 12b of a ceramic honeycomb structure 10, and provided with penetrating pores 22 at positions corresponding to the flow paths 15a or 15b, for example, by laser irradiation [FIG. 2(a)]. The plugging films 21a, 21b are provided with penetrating pores 22 in a checkerboard pattern, such that the flow paths 15a are provided with plugs 13a on the side of the end surface 12a while being open on the side of the end surface 12b, and that the flow paths 15b are provided with plugs 13b on the side of the end surface 12b while being open on the side of the end surface 12a. The penetrating pores 22 can be formed by piercing the plugging film with a sharp-pointed metal pin, or by pushing a heated metal pin to the plugging film, as long as openings are formed in the plugging film.

Figure 2B:
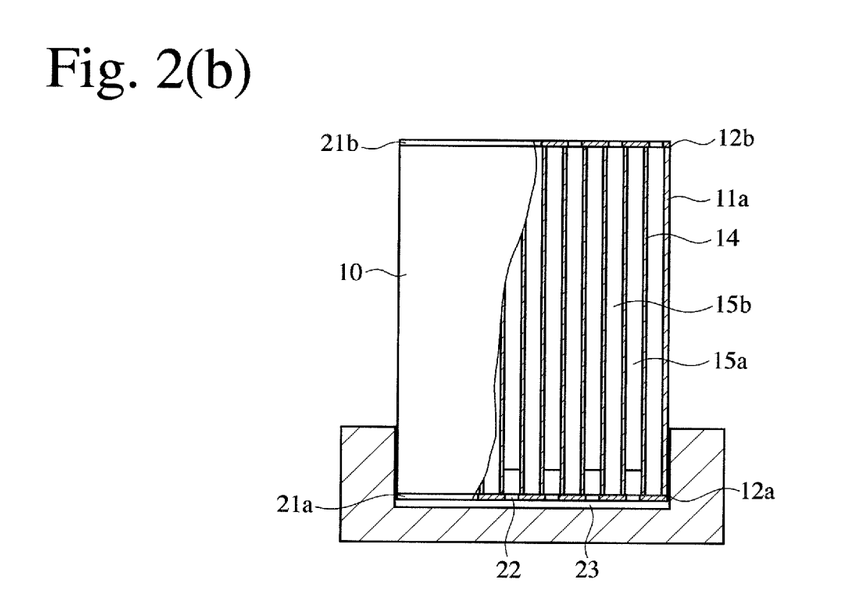
FIG. 2(b) is a schematic view showing another plugging step in the production method of a ceramic honeycomb filter.
Figure 2C:
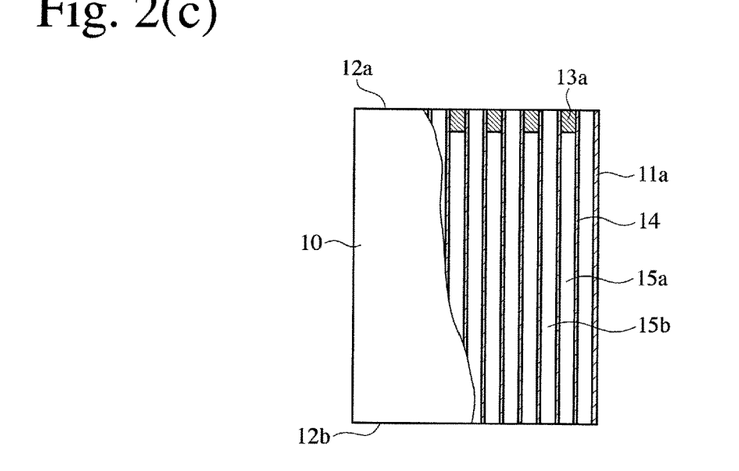
FIG. 2(c) is a schematic view showing a further plugging step in the production method of a ceramic honeycomb filter.

The ceramic honeycomb structure 10 is then immersed in a slurry of the plugging material 23 on the side of the end surface 12a, so that the plugging material 23 is introduced into the flow paths 15a through the penetrating pores 22 formed in the plugging film 21a [FIG. 2(b)]. To have fluidity for easy charging, the plugging material comprising at least ceramic particles and colloidal oxide contains water.

The plugging material charged into the predetermined flow paths of the ceramic honeycomb structure is dried by microwave heating or high-frequency dielectric heating, so that the plugging material is bonded to the ceramic honeycomb structure. In the plugging material comprising at least ceramic particles, colloidal oxide, a binder and water, the colloidal oxide irreversibly forms a strong sold, an amorphous oxide matrix, by dehydration, thereby bonding ceramic particles. Microwave heating or high-frequency dielectric heating may be conducted, after the plugging material is charged into one or both ends of the predetermined flow paths of the ceramic honeycomb structure.

By heating the plugging material by microwave heating or high-frequency dielectric heating, the entire plugs are uniformly heated without temperature gradient. Because a liquid component is evaporated from the plugging material by such uniform heating, not only from one end of plugs (for example, ends of plugs on the flow path end surface side), but also from the other end (for example, ends of plugs inside flow paths), and partially through cell walls, the phenomenon that colloidal oxide is segregated in one-side portions as in the drying of plugs in a hot-air furnace does not occur, resulting in a smaller concentration difference of colloidal oxide longitudinally in plugs. Accordingly, plugs are well bonded to cell walls at any longitudinal position. Thus, drying by microwave heating or high-frequency dielectric heating provides a ceramic honeycomb filter having a ratio A1/A2 meeting the relation of ½≤A1/A2≤2, wherein A1 represents an area ratio of an amorphous oxide matrix in a longitudinal range of ⅓×t from one end, and A2 represents an area ratio of an amorphous oxide matrix in a longitudinal range of ⅓×t from the other end, in a cross section of the plug including the center axis of the flow path; and t represents the length of plug in a direction perpendicular to the longitudinal direction. An area ratio A3 of an amorphous oxide matrix in an intermediate portion between one end and the other end meets ⅓×A1<A3≤A1, and ⅓×A2<A3≤A2.

Before microwave heating or high-frequency dielectric heating, the charged plugging material is preferably preheated. The preheating is preferably started within 5 minutes after charging, and conducted at 30-80° C. for 1-10 minutes with the charged plugging material in contact with a heat-conducting means. The preheating is conducted, for example, by bringing an end surface of the ceramic honeycomb structure on the plugging-material-charged side into contact with an electric heating plate, etc. heated to a predetermined temperature. The preheating temperature is preferably 35-70° C., more preferably 40-60° C. With the plugging material preheated, the binder in the plugging material is gelled (hardened), lowering the fluidity of a plugging material slurry, thereby preventing the end surface of the plugging material from being dented on the charged side. Thus, the resultant plugs have enough length and high strength. The binder is preferably thermally hardenable by gelation, particularly methylcellulose, etc. Though the preheating of an end surface of the ceramic honeycomb structure may be conducted by direct contact of the end surface with an electric heating plate, etc., it is preferably conducted, for example, with a paper or a cloth arranged between them, because part of the plugging material remains attached to the electric heating plate, failing to have enough plug length.

The microwave irradiation is preferably conducted at 1-30 W/g per a unit mass of the plugging material for 1-20 minutes. The high-frequency dielectric heating is preferably conducted by high-frequency power of 1-20 W/g per a unit mass of the plugging material for 1-5 minutes, with high-frequency voltage-applying electrodes placed 1-15 mm separate from the end surfaces of the ceramic honeycomb structure. The plugging material is heated to about 80-200° C. by microwave heating or high-frequency dielectric heating under such conditions, resulting in higher bonding strength of the plugs to the cell walls. Accordingly, even when the plugs are formed at 1000° C. or lower, the plugs are well bonded to the cell walls, resistant to detachment during use, resulting in a ceramic honeycomb filter free from decrease in particulate-matter-capturing performance. The gap between an end surface of the ceramic honeycomb structure and each high-frequency electrode may be determined by placing a ceramic plate having a desired thickness on the high-frequency electrode, and placing the ceramic honeycomb structure thereon.

The microwave heating or the high-frequency dielectric heating is preferably started within 20 minutes after the plugging material is charged into the predetermined flow paths of the ceramic honeycomb structure, when no preheating is conducted. When 20 minutes or more pass without preheating after charging, a liquid component in the plugging material is absorbed into the cell walls by capillary phenomenon. Accordingly, colloidal oxide in the plugging material likely migrates to the cell walls together with water, resulting in lower bonding strength of the plugs to the cell walls on the flow path end surface side, and lower strength of the plugs per se. As a result, the plugs are likely detached during use, resulting in lower particulate-matter-capturing performance. The microwave heating or high-frequency dielectric heating is more preferably conducted within 10 minutes after the plugging material is charged. While the microwave heating takes a long drying time because the entire honeycomb body including plugs is heated in a microwave apparatus, the high-frequency dielectric heating can efficiently heat the plugs only. When preheating is conducted after the plugging material is charged into the predetermined flow paths of the ceramic honeycomb structure, the binder in the plugging material is gelled. Because water is still contained in the plugging material, high bonding strength of the plugs can be obtained when the microwave heating or high-frequency dielectric heating is started within 60 minutes after preheating.

The ceramic particles have a particle size distribution having at least a first peak, and a second peak lower than the first peak, the first peak being in a particle size range of 100-200 μm, and the second peak being in a particle size range of 10-30 μm. Namely, the particle size distribution of the ceramic particles has at least two peaks, a higher peak being called "first peak," and a peak lower than the first peak being called "second peak." Such particle size distribution means that ceramic particles in the plugging material comprise at least two types of powder, powder having larger particle sizes and powder having smaller particle sizes. Using ceramic particles having such a particle size distribution, ceramic particles having smaller particle sizes intrude space between ceramic particles having larger particle sizes, resulting in plugs having a high filling density of ceramic particles. Accordingly, the plugs are then strongly bonded to the cell walls at a low temperature, resulting in a ceramic honeycomb filter suffering no decrease in particulate-matter-capturing performance, with plugs less detachable during use.

The ceramic particles having such a particle size distribution is preferably obtained by mixing 20-50% by mass of first ceramic particles having an average particle size of 90-200 μm and 50-80% by mass of second ceramic particles having an average particle size of 5-30 μm. The mixing of two types of such ceramic particles can provide ceramic particles having a particle size distribution having at least a first peak, and a second peak lower than the first peak, the first peak being in a particle size range of 100-200 μm, and the second peak being in a particle size range of 10-30 μm.

When the first ceramic particles have an average particle size of less than 90 μm, there are likely gaps between heat-dried plugs and cell walls, so that the plugs are easily detachable, resulting in low particulate-matter-capturing performance. When the first ceramic particles have an average particle size of more than 200 μm, there is likely a higher percentage of powder having larger particle sizes, resulting in low heat shock resistance. The first ceramic particles preferably have an average particle size of 100-180 μm.

When the second ceramic particles have an average particle size of less than 5 μm, there is likely a higher percentage of powder having larger particle sizes, resulting in low heat shock resistance. When the second ceramic particles have an average particle size of more than 30 μm, the heat-dried plugs likely have voids, so that the plugs are easily detachable, having low particulate-matter-capturing performance. The second ceramic particles preferably have an average particle size of 10-25 μm.

When the amount of the first ceramic particles mixed is less than 20% (when the amount of the second ceramic particles mixed is more than 80%), the heat-dried plugs likely have voids, so that the plugs are easily detachable, having low particulate-matter-capturing performance. On the other hand, when the amount of the first ceramic particles mixed is more than 50% (when the amount of the second ceramic particles mixed is less than 50%), there is likely a higher percentage of powder having larger particle sizes, resulting in low heat shock resistance. The amounts of the first and second ceramic particles are more preferably 25-45% of the first ceramic particles and 55-75% of the second ceramic particles.

Figure 4:
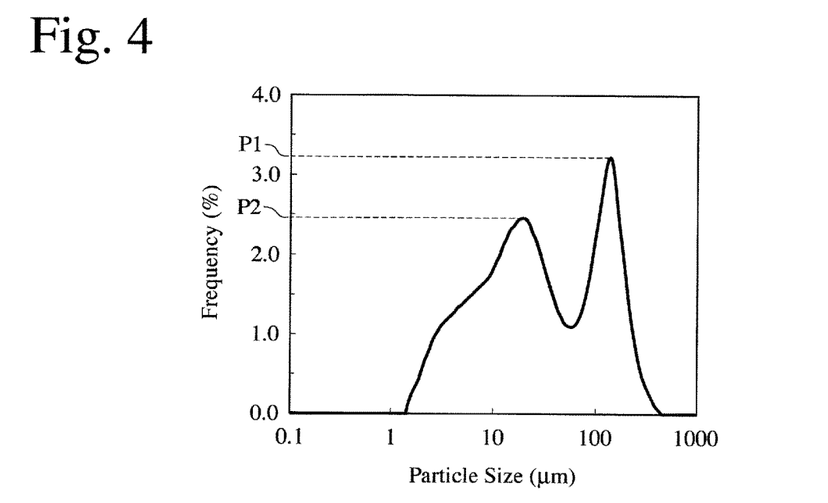
FIG. 4 is a graph showing the particle size distribution of ceramic particles used in Example 3 of the present invention.

The particle size distribution of ceramic particles can be measured by a particle size distribution meter (Microtrack MT3000 available from Nikkiso Co., Ltd.). In FIG. 4, the axis of abscissa represents a particle size, and the axis of ordinates represents the frequency (%) of each particle size. The second peak lower than the first peak means that the frequency P2 (height) of the second peak is smaller than the frequency P1 (height) of the first peak. When the plugs are formed, ceramic particles having smaller particle sizes intrude gaps between those having larger particle sizes, resulting in a higher filling ratio. To have high bonding strength between the low-temperature-bonded plugs to the cell walls, the height P1 of the first peak is preferably 3 times or less, more preferably 2 times or less, of the height P2 of the second peak.

The first ceramic particles preferably has sphericity of 0.6 or more. The first ceramic particles having sphericity of 0.6 or more have small surface areas, so that they are easily bonded to the second ceramic particles, preferably resulting in high bonding strength of the plugging material and between the plugs and the cell walls. The sphericity of the first ceramic particles is preferably 0.7 or more, more preferably 0.8 or more. The sphericity is determined by dividing the area of each projected image of 10 particles measured by image analysis on an electron photomicrograph, by the area of a circle having a diameter corresponding to the maximum length between two points at which a straight line passing a center of gravity of each particle crosses a circumference of the particle, and averaging the calculated ratios for 10 particles.

With the plugs formed by cordierite-based ceramic particles at 1000° C. or lower in the production of the ceramic honeycomb filter of the present invention, the difference in a thermal expansion coefficient between the ceramic honeycomb structure and the plugs can be made small, resulting in a ceramic honeycomb filter having good heat shock resistance. The first ceramic particles are preferably sintered porous cordierite powder. The porous cordierite powder preferably has porosity of 40-60%.

The present invention will be explained in more detail by Examples below without intention of restriction.

Example 1

Kaolin powder, talc powder, silica powder and alumina powder were mixed to prepare cordierite-forming material powder comprising 50% by mass of $SiO_2$, 35% by mass of $Al_2O_3$, and 13% by mass of MgO, which was then fully mixed with a binder such as methylcellulose, hydroxypropyl methylcellulose, etc., a lubricant, and hollow resin balloons as a pore-forming material in a dry state. With a predetermined amount of water added, they were sufficient blended to prepare a plasticized moldable ceramic material. The moldable material was extruded, and cut to a honeycomb-structured green body of 270 mm in diameter and 300 mm in length. The green body was dried and sintered to obtain a cordierite-type ceramic honeycomb structure 10 having a cell wall thickness of 0.3 mm, a cell wall pitch of 1.5 mm, porosity of 63%, and an average pore size of 21 μm.

As shown in FIG. 2, a plugging resin film of 0.09 mm in thickness was attached to each of both ground end surfaces 12a, 12b of the ceramic honeycomb structure 10, and each plugging resin film was provided with penetrating pores at positions corresponding to flow paths to be plugged in a checkerboard pattern by laser beams [FIG. 2(a)]. The penetrating pores 22 of the plugging films 21a, 21b were formed in a checkerboard pattern, such that flow paths 15b were open at the end surface 12a, and flow paths 15a were open at the end surface 12b.

As shown in Table 1, 100 parts by mass of ceramic particles obtained by mixing the first ceramic particles and the second ceramic particles (both made of cordierite) were mixed and blended with colloidal oxide (colloidal silica having a solid concentration of 40% by mass) in an amount shown in Table 2, 50 parts by mass of ion-exchanged water, 2.5 parts by mass of methylcellulose as a binder, to prepare a plugging material slurry. The particle size distribution of the ceramic particles used was measured by a particle size distribution meter (Microtrack MT3000 available from Nikkiso Co., Ltd.), to determine the frequency P1 (height) of the first peak and the frequency P2 (height) of the second peak.

TABLE 1

| No. | First Ceramic Particles[1] | | | Second Ceramic Particles[2] | | |
|---|---|---|---|---|---|---|
| | Average Particle Size (μm) | Sphericity | Amount (parts by mass) | Average Particle Size (μm) | Sphericity | Amount (parts by mass) |
| Example 1 | 125 | 0.8 | 32 | 13.5 | 0.6 | 68 |
| Example 2 | 125 | 0.8 | 40 | 13.5 | 0.6 | 60 |
| Example 3 | 125 | 0.8 | 23 | 13.5 | 0.6 | 77 |
| Example 4 | 190 | 0.7 | 31 | 27 | 0.5 | 69 |
| Example 5 | 125 | 0.8 | 32 | 13.5 | 0.6 | 68 |
| Example 6 | 125 | 0.8 | 23 | 13.5 | 0.6 | 77 |
| Com. Ex. 1 | 25 | 0.8 | 100 | — | — | — |
| Com. Ex. 2 | 167 | 0.6 | 5 | 13 | 0.6 | 95 |
| Com. Ex. 3 | 250 | 0.4 | 33 | 36 | 0.4 | 67 |
| Com. Ex. 4 | 25 | 0.8 | 100 | — | — | — |

| No. | Mixed Ceramic Particles | | |
|---|---|---|---|
| | Particle Size at First Peak (P1) (μm) | Particle Size at Second Peak (P2) (μm) | Peak Height Ratio (P1/P2) |
| Example 1 | 141 | 19.5 | 1.3 |
| Example 2 | 141 | 19.5 | 1.6 |
| Example 3 | 141 | 19.5 | 1.2 |
| Example 4 | 183 | 27 | 1.4 |
| Example 5 | 141 | 19.5 | 1.3 |
| Example 6 | 141 | 19.5 | 1.2 |
| Com. Ex. 1 | 25 | — | — |
| Com. Ex. 2 | 15 | 160 | 1.2 |
| Com. Ex. 3 | 235 | 33 | 1.3 |
| Com. Ex. 4 | 25 | — | — |

Note:
[1]Cordierite particles.
[2]Cordierite particles.

TABLE 2

| No. | Formulation (parts by mass) | |
|---|---|---|
| | Ceramic Particles[1] | Colloidal Oxide[2] |
| Example 1 | 100 | 40 [16] |
| Example 2 | 100 | 40 [16] |
| Example 3 | 100 | 40 [16] |
| Example 4 | 100 | 37.5 [15] |
| Example 5 | 100 | 40 [16] |
| Example 6 | 100 | 40 [16] |
| Com. Ex. 1 | 100 | 40 [16] |
| Com. Ex. 2 | 100 | 40 [16] |
| Com. Ex. 3 | 100 | 37.5 [15] |
| Com. Ex. 4 | 100 | 40 [16] |

Note:
[1]A mixture of the first ceramic particles and the second ceramic particles.
[2]Colloidal silica having a solid concentration of 40% by mass.
[3]The amount of colloidal silica on a solid basis in the parenthesis.

The end surface 12a of the ceramic honeycomb structure 10 was immersed in a bath of a plugging material 23, which was introduced into the flow paths 15a to the depth of 10 mm through penetrating pores 22 formed in the plugging film 21a [FIG. 2(b)]. Immediately after introducing the plugging material 23, the end surface 12a on the side of which the plugging material 23 was introduced was preheated via four papers on an electric heating plate at 50° C. for 5 minutes. Another end surface 12b of the ceramic honeycomb structure 10 was then immersed in a bath of the plugging material 23, which was similarly introduced into the flow paths 15b to the depth of 10 mm through penetrating pores 22 formed in the plugging film 21b. The end surface 12b was also preheated by a hot plate like the end surface 12a. With the plugging films 21a, 21b peeled, the plugs were heated by microwave of 2450 MHz having power of 12 W/g per a unit mass of the plugging material in a microwave heating apparatus for 4 minutes (see Table 3), to dry the plugging material 23, thereby producing the of ceramic honeycomb filter of Example 1.

TABLE 3

| | Heating Conditions | | | |
|---|---|---|---|---|
| No. | Preheating | Maximum Time Until Heating Was Started After Charged | Heating Method | Heating Time |
| Example 1 | 50° C., 5 minutes | 13 minutes | Microwave (12 W/g) | 4 minutes |
| Example 2 | 50° C., 5 minutes | 13 minutes | microwave (12 W/g) | 4 minutes |
| Example 3 | 50° C., 5 minutes | 13 minutes | Microwave (12 W/g) | 4 minutes |
| Example 4 | 50° C., 5 minutes | 15 minutes | Microwave (12 W/g) | 4 minutes |
| Example 5 | No | 8 minutes | Microwave (12 W/g) | 4 minutes |

TABLE 3-continued

| | | Heating Conditions | | |
|---|---|---|---|---|
| No. | Preheating | Maximum Time Until Heating Was Started After Charged | Heating Method | Heating Time |
| Example 6 | 50° C., 5 minutes | 13 minutes | High-Frequency (6.5 W/g) | 1 minute |
| Com. Ex. 1 | 50° C., 5 minutes | 35 minutes | Hot Air Furnace (500° C.) | 3 hours |
| Com. Ex. 2 | 50° C., 5 minutes | 35 minutes | Hot Air Furnace (500° C.) | 3 hours |
| Com. Ex. 3 | 50° C., 5 minutes | 13 minutes | Microwave (12 W/g) | 4 minutes |
| Com. Ex. 4 | 50° C., 5 minutes | 13 minutes | Microwave (12 W/g) | 4 minutes |

Examples 2-4

The ceramic honeycomb filters of Examples 2-4 were produced in the same manner as in Example 1, except that the types and amounts of the ceramic particles and colloidal oxide (colloidal silica having a solid concentration of 40% by mass) were changed as shown in Tables 1 and 2, and that the heating conditions were changed as shown in Table 3.

Example 5

A ceramic honeycomb structure 10 was produced in the same manner as in Example 1, and the plugging material 23 was introduced into the ceramic honeycomb structure 10 on the side of the end surface 12a. The end surface 12a on the side of which the plugging material 23 was introduced was not preheated. The plugging material 23 was then introduced into another end surface 12b of the ceramic honeycomb structure 10 as in Example 1, with the end surface 12b similarly not preheated. With the plugging films 21a, 21b peeled, microwave heating was conducted in the same manner as in Example 1 to produce the ceramic honeycomb filter of Example 5.

Example 6

The ceramic honeycomb filter of Example 6 was produced in the same manner as in Example 3, except that the plugs were heated by high-frequency (40 MHz) power of 6.5 W/g per a unit mass of the plugging material at the distance of 3 mm from an end surface of the ceramic honeycomb structure for 1 minute by a high-frequency dielectric heating apparatus, in place of the microwave heating (see Table 3).

Comparative Examples 1-4

The ceramic honeycomb filters of Comparative Examples 1-4 were produced in the same manner as in Example 1, except that the types and amounts of ceramic particles and the amount of colloidal oxide (colloidal silica having a solid concentration of 40% by mass) were changed as shown in Tables 1 and 2, and that the heating conditions were changed as shown in Table 3. The ceramic honeycomb filter of Comparative Example 1 produced by the method described in JP 2005-125318 A had a particle size distribution having one peak, because ceramic particles comprising only one type of ceramic particles was used as aggregate (see Table 1).

With respect to the plugs in the ceramic honeycomb filters of Examples and Comparative Examples, the area ratios of amorphous oxide matrices, the bonding strength of plugs, soot-capturing performance and heat shock resistance were elevated as follows. The results are shown in Table 4.

(1) Area Ratio of Amorphous Oxide Matrix in Plugs

An electron photomicrograph of a cross section of a plug including the center axis of a flow path was analyzed by an image analyzer (Image-Pro Plus ver. 6.3 available from Media Cybernetics) to measure the areas of aggregate and an amorphous oxide matrix, from which an area ratio A1 of an amorphous oxide matrix in a range a1 corresponding to ⅓ of the width t of the plug from one end 131a (ends of the plug on the flow path end surface side in the figure), and an area ratio A2 of an amorphous oxide matrix in a range a2 corresponding to ⅓ of the width t of the plug from the other end 132a (ends of the plug inside the flow path in the figure), to calculate a ratio A1/A2, as shown in FIG. 3. Further, an area ratio A3 of an amorphous oxide matrix in an intermediate portion between one end 131a and the other end 132a of plugs 13a (at center of a range a3 between the range a1 and the range a2) was determined.

(2) Strength of Plugs

The bonding strength of plugs to cell walls was determined by pushing a flat-tipped push rod having a diameter of 0.8 mm to a plug, measuring a load when the push rod crashed the plug, or when the plug was detached, dividing the load by a cross section area (2.01 mm$^2$) of the push rod to calculate the strength (MPa) of each plug, and averaging the strength values measured on 10 plugs. The results are shown in Table 4.

(3) Soot-Capturing Performance

With carbon powder having a particle size of 0.042 μm introduced into a ceramic honeycomb filter at a speed of 3 g/h together with air flow of 10 Nm$^3$/min in a pressure loss test stand, the number Nin of carbon powder particles flowing into the honeycomb filter and the number Nout of carbon powder particles flowing out of the honeycomb filter were counted by Model 3936 of a scanning mobility particle sizer (SMPS) available from TIS, for 1 minute between 3 minutes and 4 minutes after start, to calculate the capturing ratio of soot by the formula of (Nin−Nout)/Nin. Soot-capturing performance was evaluated by the following standard:

Excellent: The capturing ratio was 98% or more,
Good: The capturing ratio was 95% or more and less than 98%,
Fair: The capturing ratio was 90% or more and less than 95%, and
Poor: The capturing ratio was less than 90%.

(4) Heat Shock Resistance

The evaluation test of heat shock resistance was conducted by heating the ceramic honeycomb filter at 400° C. for 30 minutes in an electric furnace, rapidly cooling it to room temperature, and observing cracks in cell walls near the plugs by the naked eye. When no cracks were observed, the same test was conducted with the temperature of the electric furnace elevated by 25° C., and this operation was repeated until cracking occurred. The test was conducted three times for each sample. The difference between a temperature at which cracking occurred in at least one honeycomb structure and room temperature (heating temperature−room temperature) was regarded as a heat shock resistance temperature, which was evaluated by the following standard:

Excellent: The heat shock resistance temperature was 550° C. or higher,

Good: The heat shock resistance temperature was 500° C. or higher and lower than 550° C., Fair: The heat shock resistance temperature was 450° C. or higher and lower than 500° C., and Poor: The heat shock resistance temperature was lower than 450° C.

(5) Porosity of Plugs

The porosity of plugs was determined by analyzing an electron photomicrograph of a cross section of a plug cut out of the ceramic honeycomb filter by an image analyzer (Image-Pro Plus ver. 7.0 of Media Cybernetics).

TABLE 4

| No. | Amorphous Oxide Matrix in Plug Area Ratio | | | | Porosity of Plug (%) | Evaluation Results | | |
|---|---|---|---|---|---|---|---|---|
| | A1 | A2 | A3 | A1/A2 | | Bonding Strength (MPa) | Capturing Ratio | Heat Shock Resistance |
| Example 1 | 42 | 40 | 17 | 1.1 | 28 | 51 | Excellent | Excellent |
| Example 2 | 40 | 34 | 15 | 1.2 | 31 | 45 | Excellent | Good |
| Example 3 | 41 | 35 | 18 | 1.2 | 27 | 34 | Good | Excellent |
| Example 4 | 40 | 32 | 19 | 1.3 | 30 | 34 | Good | Excellent |
| Example 5 | 42 | 40 | 13 | 1.1 | 29 | 29 | Excellent | Excellent |
| Example 6 | 41 | 35 | 15 | 1.2 | 28 | 34 | Good | Excellent |
| Com. Ex. 1 | 45 | 8 | 9 | 5.6 | 38 | 22 | Poor | Good |
| Com. Ex. 2 | 43 | 15 | 17 | 2.9 | 24 | 24 | Poor | Good |
| Com. Ex. 3 | 42 | 19 | 21 | 2.2 | 43 | 23 | Fair | Fair |
| Com. Ex. 4 | 43 | 18 | 20 | 2.4 | 32 | 24 | Poor | Good |

Figure 5:
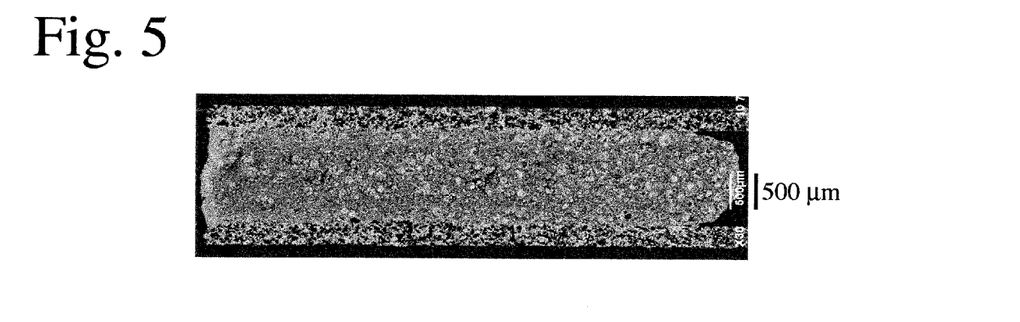
FIG. 5 is an electron photomicrograph showing a cross section of a plug in the ceramic honeycomb filter produced in Example 1 of the present invention.

FIG. 5 is an electron photomicrograph of a cross section of a plug in the ceramic honeycomb filter of Example 1 of the present invention, indicating that the plugs produced by the method of the present invention were uniform with little segregation of colloidal oxide. It is clear from Table 4 that the ceramic honeycomb filters of Examples 1-6 of the present invention had excellent bonding strength of plugs, soot-capturing performance and heat shock resistance, though the plug-bonding strength was slightly poor in Example 5, in which preheating was not conducted.

On the other hand, in any of Comparative Example 1 in which ceramic particles having a particle size distribution having only one peak at 25 μm was used for a plugging material which was dried in a hot-air furnace, Comparative Example 4 in which a plugging material comprising the same ceramic particles as in Comparative Example 1 was dried by microwave, and Comparative Example 2 in which ceramic particles having two peaks at 15 μm (first peak) and at 160 μm (second peak), the first peak being outside the particle size range of 100-200 μm, and the second peak being outside the particle size range of 10-30 μm was used for a plugging material which was dried in a hot-air furnace, the plug-bonding strength and the soot-capturing performance were extremely poor. In Comparative Example 3 in which ceramic particles having a first peak outside the particle size range of 100-200 μm and a second peak outside the particle size range of 10-30 μm, the plug-bonding strength was extremely poor, and the soot-capturing performance and the heat shock resistance were slightly poor.

What is claimed is:

1. A method for producing a ceramic honeycomb filter comprising a ceramic honeycomb structure having pluralities of flow paths partitioned by porous cell walls made of a material comprising cordierite as a main crystal, and plugs formed in predetermined flow paths of said ceramic honeycomb structure; comprising charging a plugging material comprising at least 100 parts by mass of ceramic particles, 5-20 parts by mass on a solid basis of colloidal oxide and 1.5-4 parts by mass of a binder into the predetermined flow paths of said ceramic honeycomb structure, and drying said plugging material by microwave heating or high-frequency dielectric heating to form said plugs;

said ceramic particles having a particle size distribution at least a first peak and a second peak lower than said first peak, said first peak being in a particle size range of 100-200 μm, and said second peak being in a particle size range of 10-30 μm.

2. The method for producing a ceramic honeycomb filter according to claim 1, wherein after said plugging material is charged into the predetermined flow paths of said ceramic honeycomb structure, and before said microwave heating or high-frequency dielectric heating is conducted, an end surface of said ceramic honeycomb structure on the side that said plugging material is charged is preheated at 30-80° C. for 1-10 minutes with a heat-conducting means contacted.

3. The method for producing a ceramic honeycomb filter according to claim 1, wherein said ceramic particles comprise 20-50% by mass of first ceramic particles having an average particle size of 90-200 μm, and 50-80% by mass of second ceramic particles having an average particle size of 5-30 μm.

4. The method for producing a ceramic honeycomb filter according to claim 1, wherein said microwave heating is conducted by irradiating microwave with power of 1-30 W/g per a unit mass of said plugging material for 1-20 minutes.

5. The method for producing a ceramic honeycomb filter according to claim 1, wherein said high-frequency dielectric heating is conducted by applying a high-frequency electric field with power of 1-20 W/g per a unit mass of said plugging material at a distance of 1-15 mm between an end surface of said ceramic honeycomb structure and a high-frequency electrode, for 1-5 minutes.

6. The method for producing a ceramic honeycomb filter according to claim 1, wherein said colloidal oxide is colloidal silica.

7. The method for producing a ceramic honeycomb filter according to claim 1, wherein said ceramic particles are based on cordierite.

8. The method for producing a ceramic honeycomb filter according to claim 1, wherein said plugs are formed without sintering.

* * * * *